US012802260B2

(12) United States Patent
Hsieh

(10) Patent No.: US 12,802,260 B2
(45) Date of Patent: Nov. 17, 2026

(54) METHOD FOR CALIBRATING VIRTUAL OBJECT AND CALIBRATING DEVICE

(71) Applicant: HTC Corporation, Taoyuan City (TW)

(72) Inventor: Cheng-Han Hsieh, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 226 days.

(21) Appl. No.: 18/780,538

(22) Filed: Jul. 23, 2024

(65) Prior Publication Data

US 2025/0157069 A1 May 15, 2025

Related U.S. Application Data

(60) Provisional application No. 63/598,935, filed on Nov. 14, 2023.

(51) Int. Cl.
*G06T 7/70* (2017.01)
*G06F 3/01* (2006.01)

(52) U.S. Cl.
CPC ................ *G06T 7/70* (2017.01); *G06F 3/014* (2013.01); *G06F 3/017* (2013.01)

(58) Field of Classification Search
None
See application file for complete search history.

(56) References Cited

U.S. PATENT DOCUMENTS

2007/0211027 A1* 9/2007 Ohta ..................... G06F 3/0325 345/158
2024/0320864 A1* 9/2024 Nishi ..................... H04N 19/54

FOREIGN PATENT DOCUMENTS

TW 202329039 7/2023
TW 202335707 9/2023

OTHER PUBLICATIONS

"Office Action of Taiwan Counterpart Application", issued on Feb. 12, 2025, p. 1-p. 8.

* cited by examiner

*Primary Examiner* — Matthew Yeung
(74) *Attorney, Agent, or Firm* — JCIPRNET

(57) ABSTRACT

The embodiments of the disclosure provide method for calibrating a virtual object and a calibrating device. The method includes: determining a reference direction associated with a first virtual object in a virtual world; obtaining a current motion data of an input device corresponding to the first virtual object from a motion detection circuit of the input device; obtaining a predetermined heading of the motion detection circuit of the input device; determining a current pose of the first virtual object with respect to the input device based on the predetermined heading of the motion detection circuit and the current motion data of the input device; determining a calibrating factor based on the reference direction and the current pose of the first virtual object; and calibrating an object pose of the first virtual object based on the calibrating factor.

20 Claims, 11 Drawing Sheets

METHOD FOR CALIBRATING VIRTUAL OBJECT AND CALIBRATING DEVICE

CROSS-REFERENCE TO RELATED APPLICATION

This application claims the priority benefit of U.S. provisional application Ser. No. 63/598,935, filed on Nov. 14, 2023. The entirety of the above-mentioned patent application is hereby incorporated by reference herein and made a part of this specification.

BACKGROUND

1. Field of the Invention

The present disclosure generally relates to a mechanism for providing a calibrating mechanism, in particular, to a method for calibrating a virtual object and a calibrating device.

2. Description of Related Art

See FIG. 1, which shows a schematic diagram of interacting with the virtual world by using an input device. In FIG. 1, the user may use the input device 101 (e.g., a wearable device such as a smart ring) worn on the finger thereof to interact with the virtual world, wherein the virtual world may be the virtual environment provided by the reality service immersed by the user, such as a virtual reality (VR) world.

In the virtual world of FIG. 1, the virtual object 102 may be rendered based on the tracked pose of the input device 101, and the virtual object 102 may be further rendered with a ray 103, wherein the user may use the ray 103 to, for example, pointing to a desired position in the virtual world for interaction.

However, as time of the user immersing in the virtual world prolongs, the tracking error of the poses of the input device 101 may be accumulated, such that the virtual object 102 and the ray 103 may not be accurately rendered.

As shown in FIG. 1, the virtual object 102 and the ray 103 in the virtual world may be drifted and fail to correctly correspond to the user's hand in the real world, which may make the user unable to accurately perform the desired indicating/pointing action.

SUMMARY OF THE INVENTION

Accordingly, the disclosure is directed to a method for calibrating a virtual object and a calibrating device, which may be used to solve the above technical problems.

The embodiments of the disclosure provide method for calibrating a virtual object, applied to a calibrating device. The method includes: determining, by the calibrating device, a reference direction associated with a first virtual object in a virtual world; obtaining, by the calibrating device, a current motion data of an input device corresponding to the first virtual object from a motion detection circuit of the input device; obtaining, by the calibrating device, a predetermined heading of the motion detection circuit of the input device; determining, by the calibrating device, a current pose of the first virtual object with respect to the input device based on the predetermined heading of the motion detection circuit and the current motion data of the input device; determining, by the calibrating device, a calibrating factor based on the reference direction and the current pose of the first virtual object; and calibrating, by the calibrating device, an object pose of the first virtual object based on the calibrating factor.

The embodiments of the disclosure provide a calibrating device including a storage circuit and a processor. The storage circuit stores a program code. The processor is coupled to the storage circuit and accesses the program code to perform: determining a reference direction associated with a first virtual object in a virtual world; obtaining a current motion data of an input device corresponding to the first virtual object from a motion detection circuit of the input device; obtaining a predetermined heading of the motion detection circuit of the input device; determining a current pose of the first virtual object with respect to the input device based on the predetermined heading of the motion detection circuit and the current motion data of the input device; determining a calibrating factor based on the reference direction and the current pose of the first virtual object; and calibrating an object pose of the first virtual object based on the calibrating factor.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
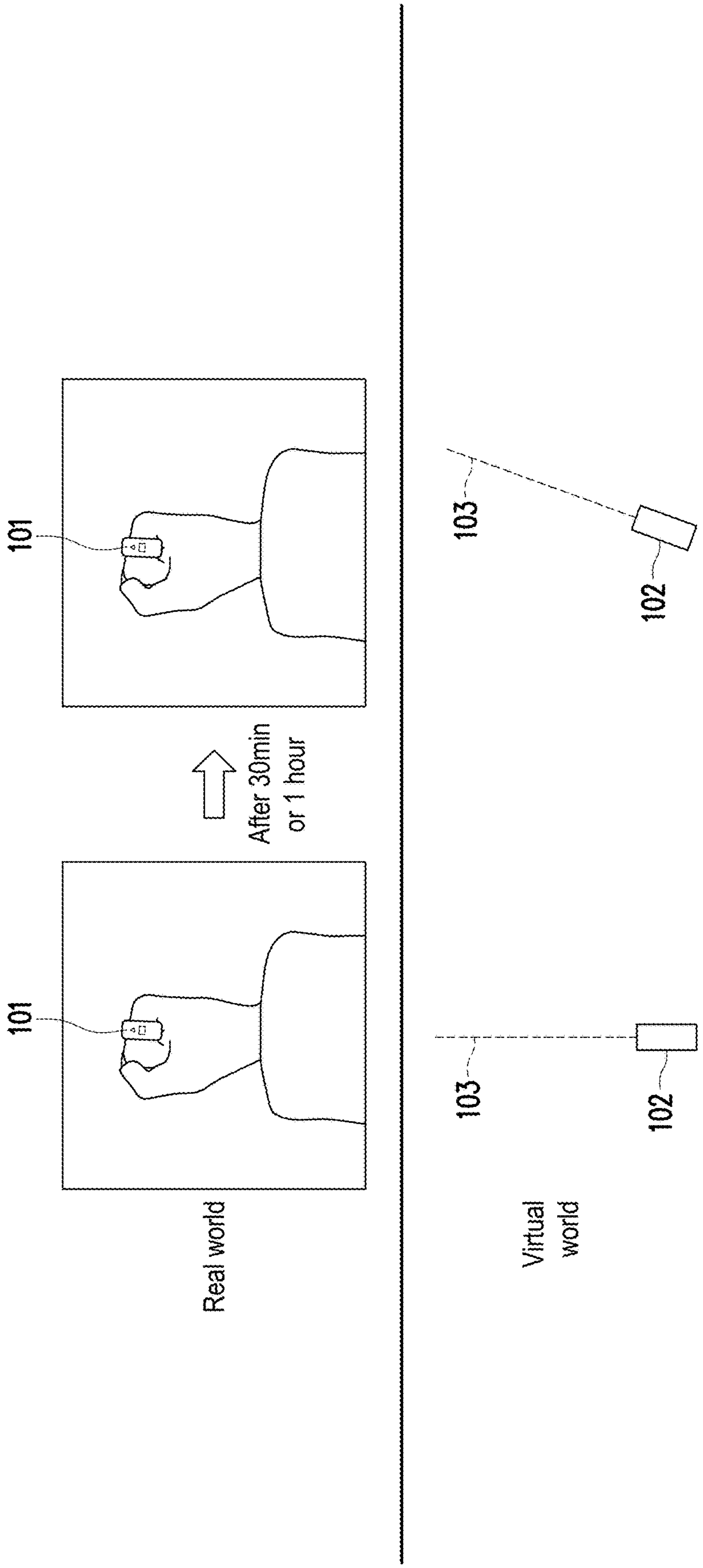
FIG. 1(PRIOR ART)
FIG. 1 shows a schematic diagram of interacting with the virtual world by using an input device.

Reference will now be made in detail to the present preferred embodiments of the invention, examples of which are illustrated in the accompanying drawings. Wherever possible, the same reference numbers are used in the drawings and the description to refer to the same or like parts.

Figure 2:
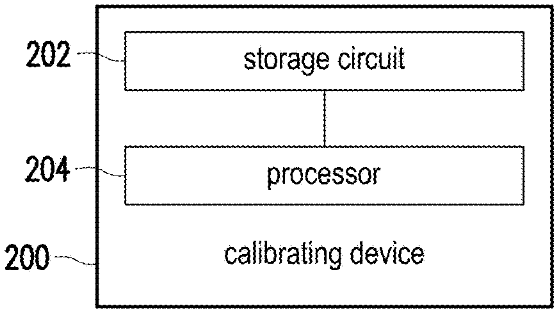
FIG. 2 shows a schematic diagram of a calibrating device according to an embodiment of the disclosure.

See FIG. 2, which shows a schematic diagram of a calibrating device according to an embodiment of the disclosure.

In various embodiments, the calibrating device 200 may be any smart device and/or computer devices. In some embodiments, the calibrating device 200 can be any input device that can be worn on the user for performing specific operations.

In FIG. 2, the storage circuit 202 is one or a combination of a stationary or mobile random access memory (RAM), read-only memory (ROM), flash memory, hard disk, or any other similar device, and which records a plurality of modules and/or a program code that can be executed by the processor 204.

The processor 204 may be coupled with the storage circuit 202, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In a first embodiment, the calibrating device 200 may be an input device, and the calibrating device 200 may be connected with a host for providing the visual content of a reality service, wherein the host may be, for example, a head-mounted display (HMD), and the reality service may be a VR service, an augmented reality (AR) service, a mixed reality (MR) service, and/or an extended reality (ER) service, etc.

In this case, the input device (which may be a wearable device worn on the user) may be used by the user to interact with the visual content (e.g., a VR world) provided by the host. For example, the calibrating device 200 may be the input device 101 in FIG. 1 but the disclosure is not limited thereto.

In a second embodiment, the calibrating device 200 may be the host (e.g., the HMD) that can display the visual contents of the considered reality services for the user to see. In the second embodiment, the user can also use an input device (e.g., the input device 101 in FIG. 1) to interact with the visual content shown by the connected host.

In the first and/or second embodiment, the host can render a virtual object corresponding to the input device in the visual content, such as the virtual object 102 in FIG. 1. However, as mentioned in the above, the virtual object (and/or the associated ray) may be drifted as time goes by.

Accordingly, the embodiments of the disclosure provide a method for calibrating a virtual object, which may be used to resolve the problem, and the associated details would be provided in the following.

In the embodiments of the disclosure, the processor 204 may access the modules and/or the program code stored in the storage circuit 202 to implement the method for calibrating a virtual object provided in the disclosure, which would be further discussed in the following.

Figure 3:
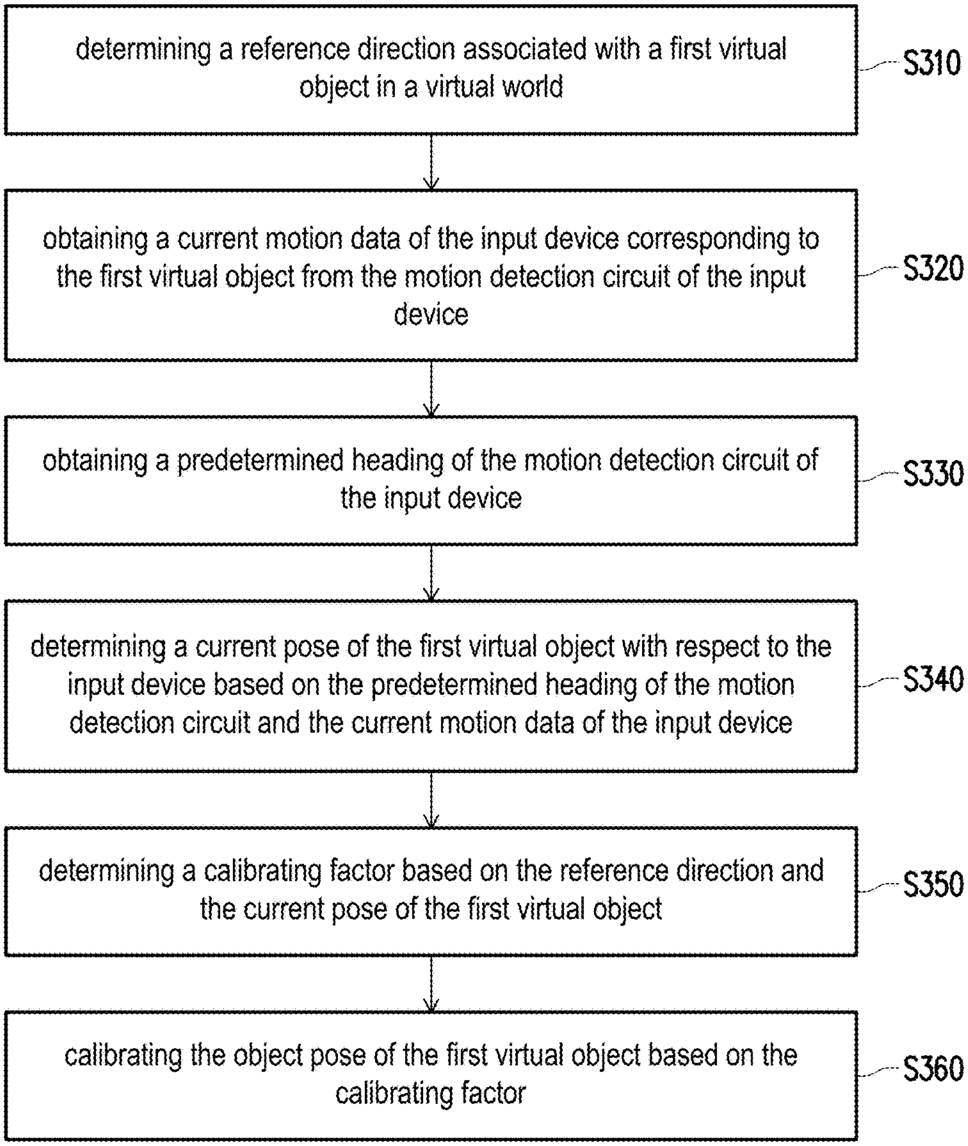
FIG. 3 shows a flow chart of the method for calibrating a virtual object according to an embodiment of the disclosure.

See FIG. 3, which shows a flow chart of the method for calibrating a virtual object according to an embodiment of the disclosure. The method of this embodiment may be executed by the calibrating device 200 in FIG. 2, and the details of each step in FIG. 3 will be described below with the components shown in FIG. 2.

In step S310, the processor 204 determines a reference direction (represented by $V_{ref}$) associated with a first virtual object in a virtual world.

In one embodiment, the first virtual object has an indicator in the virtual world, and the reference direction $V_{ref}$ corresponds to a designated direction of the indicator.

In various embodiments, the reference direction $V_{ref}$ may be determined in different ways.

Figure 4A:
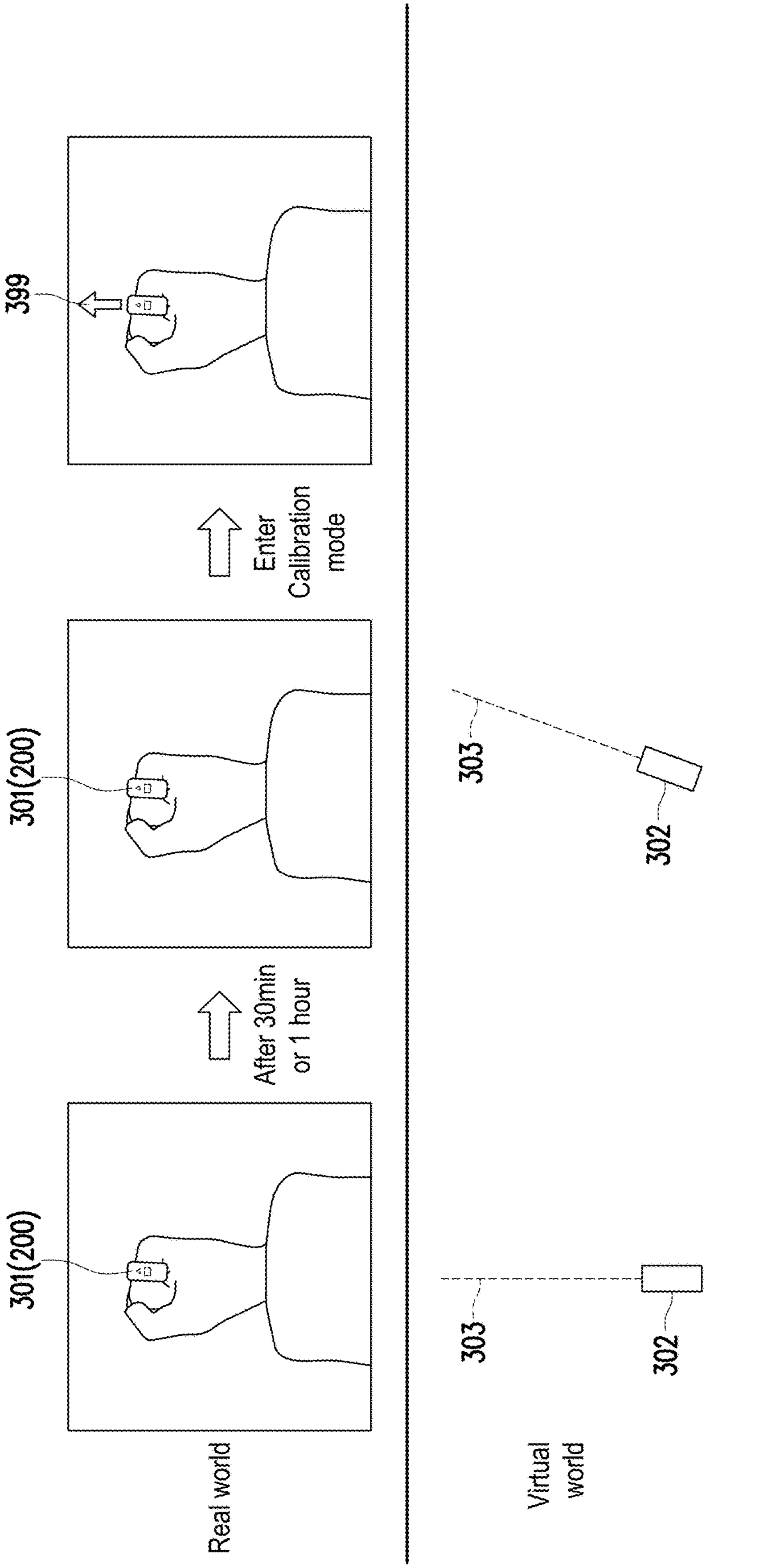
FIG. 4A shows a schematic diagram of determining the reference direction according to the first embodiment of the disclosure.

See FIG. 4A, which shows a schematic diagram of determining the reference direction according to the first embodiment of the disclosure.

In FIG. 4A, it is assumed that the user wears an input device 301 (e.g., a smart ring) on the index finger and uses the input device 301 to interact with the virtual world (e.g., the VR world) of the reality service provided by the host (e.g., the HMD) connected with the input device 301.

In the first embodiment, since the calibrating device 200 may be an input device as mentioned in the above, the calibrating device 200 may be assumed to be the input device 301 in FIG. 4A, but the disclosure is not limited thereto.

In the embodiment, the host may render a first virtual object 302 (e.g., a virtual model of the input device 301) according to the tracked pose of the input device 301, and the first virtual object 302 may have an indicator 303 (e.g., a ray) in the virtual world.

As mentioned in the above, the first virtual object 302 and the associated indicator 303 may be drifted as time goes by. In this case, the user may activate a calibration function of the host, wherein the calibration function may be used to calibrate the object pose of the first virtual object 302.

In one embodiment, after the calibration function has been activated, the host may provide a calibration mode that instructs the user to input the sliding direction 399. In the embodiment, the sliding direction 399 may be the direction corresponding to the required direction of the indicator 303 of the user.

From another perspective, the user may determine any required direction where the indicator 303 should indicate (e.g., point to) as the sliding direction 399, but the disclosure is not limited thereto.

In one embodiment, the input device 301 (e.g., the calibrating device 200) may be disposed with an optical sensor that is capable of sensing the sliding operation inputted by the user. In this case, the user may perform the sliding operation corresponding to the sliding direction 399 to the optical sensor for inputting the sliding direction 399 to the calibrating device 200.

In one embodiment, the optical sensor may be an optical finger navigation (OFN) sensor. In this case, the user may use, for example, the thumb thereof to slide toward the sliding direction 399 on the OFN sensor, such that the OFN sensor can detect the sliding direction 399.

However, since the object pose of the first virtual object 302 may be mainly determined based on the motion data provided by the motion detection circuit (e.g., an inertia measurement unit (IMU)) disposed in the input device 301, the representation of the sliding direction 399 with respect to the motion detection circuit needs to be derived.

In the embodiment, the representation of the sliding direction 399 with respect to the motion detection circuit may be understood as the designated direction of the indicator 303, but the disclosure is not limited thereto.

Therefore, after the input device 301 (e.g., the calibrating device 200) has detected the sliding direction 399 by using the optical sensor, the calibrating device 200 may convert the sliding direction 399 into the designated direction based on a relative position between a first coordinate system of the optical sensor and a second coordinate system of a motion detection circuit (e.g., an inertia measurement unit (IMU)) of the input device 301.

Figure 4B:
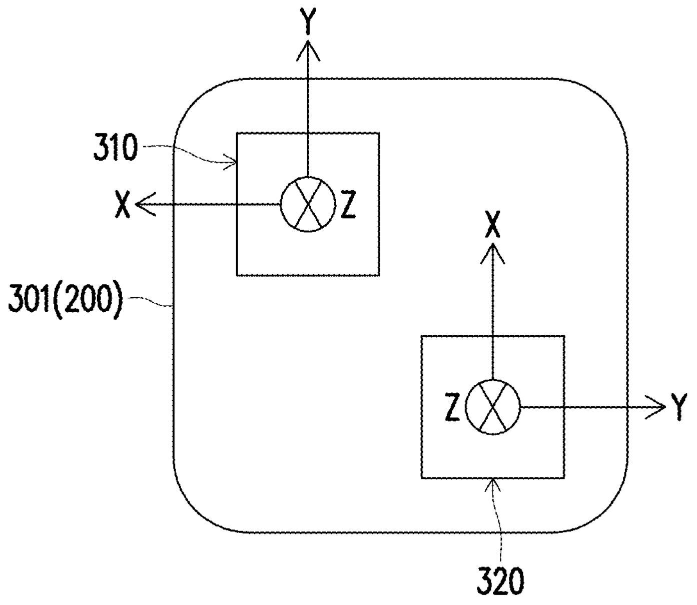
FIG. 4B shows a schematic diagram of the relative position between the first coordinate system of the optical sensor and the second coordinate system of the motion detection circuit of the input device.

See FIG. 4B, which shows a schematic diagram of the relative position between the first coordinate system of the optical sensor and the second coordinate system of the motion detection circuit of the input device.

In the embodiment, it is assumed that the first coordinate system 310 of the optical sensor and the second coordinate system 320 of the motion detection circuit have the relative position shown in FIG. 4B.

In this case, the calibrating device 200 may accordingly convert the sliding direction detected by the optical sensor into the corresponding designated direction.

For example, if the detected sliding direction is (0, 1, 0) in the first coordinate system 310 (i.e., the direction corresponding to the Y-axis of the first coordinate system 310), the corresponding designated direction in the second coordinate system would be (1, 0, 0) (i.e., the direction corresponding to the X-axis of the second coordinate system 320).

For another example, if the detected sliding direction is (1, 0, 0) in the first coordinate system 310 (i.e., the direction corresponding to the X-axis of the first coordinate system 310), the corresponding designated direction in the second coordinate system would be (0, −1, 0) (i.e., the direction corresponding to the minus Y-axis of the second coordinate system 320).

In the embodiment of FIG. 4B, the converting mechanism for converting the sliding direction into the corresponding designated direction may be characterized by $Q_{convert}(w,x,y,z)=(0.7071068, 0, -0.7071068, 0)$ (which is in the form of quaternion), but the disclosure is not limited thereto.

In the first embodiment, the calibrating device 200 may determine the designated direction as the reference direction $V_{ref}$ considered in step S310.

Figure 5:
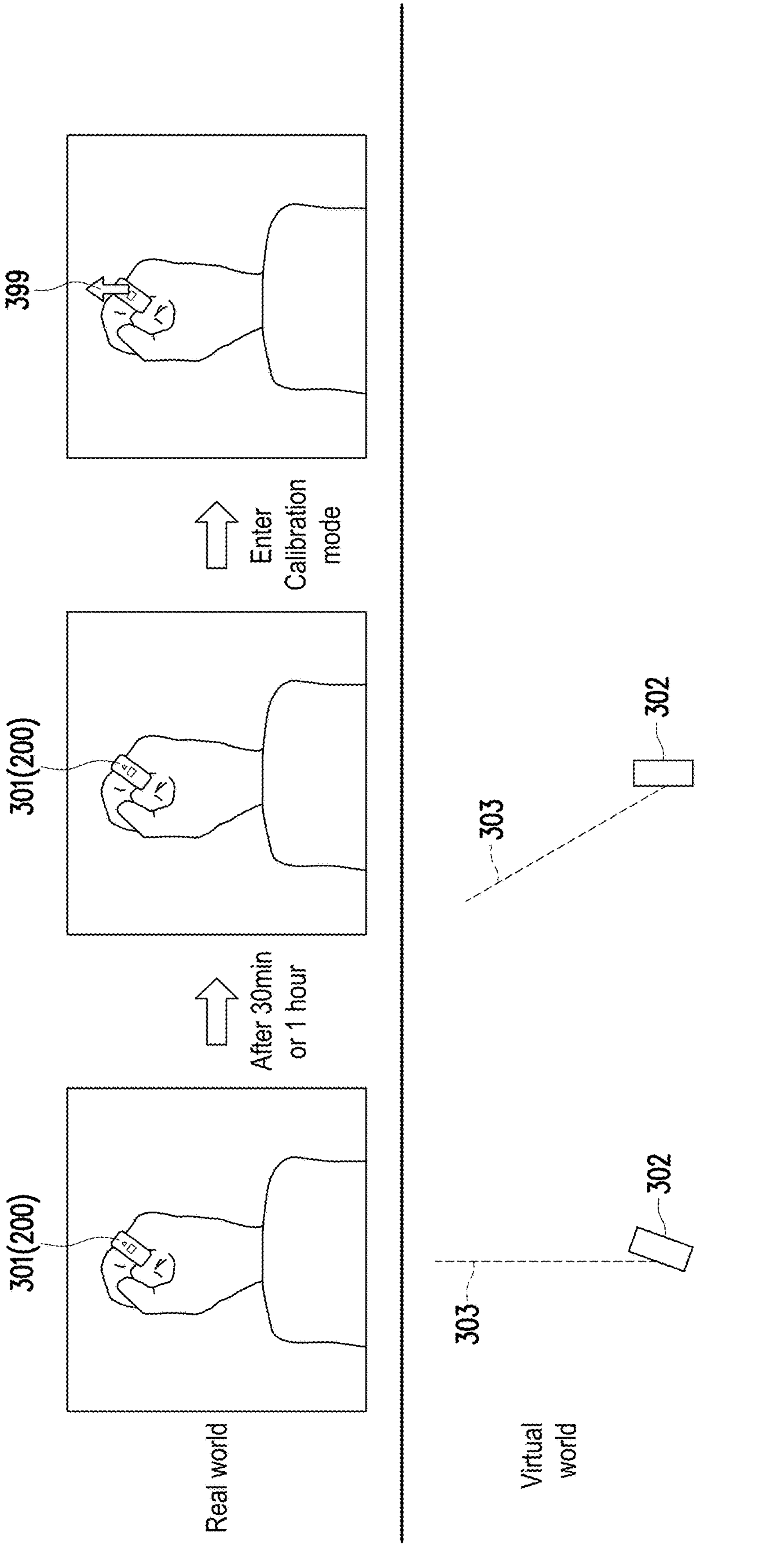
FIG. 5 shows another schematic diagram of determining the designated direction according to the first embodiment of the disclosure.

See FIG. 5, which shows another schematic diagram of determining the designated direction according to the first embodiment of the disclosure.

In the embodiment, the indicator 303 may not be originated from the front end of the first virtual object 302 due to the variety of human hand shape/contour. Nevertheless, the input device 301 may still detect the sliding direction 399 during the calibration mode as described in the discussions of FIG. 4A, and the calibrating device 200 may still be able to convert the sliding direction 399 into the corresponding designated direction with respect to the motion detection circuit, which would not be repeated herein.

Likewise, the calibrating device 200 may determine the designated direction as the reference direction $V_{ref}$ considered in step S310.

Figure 6A:
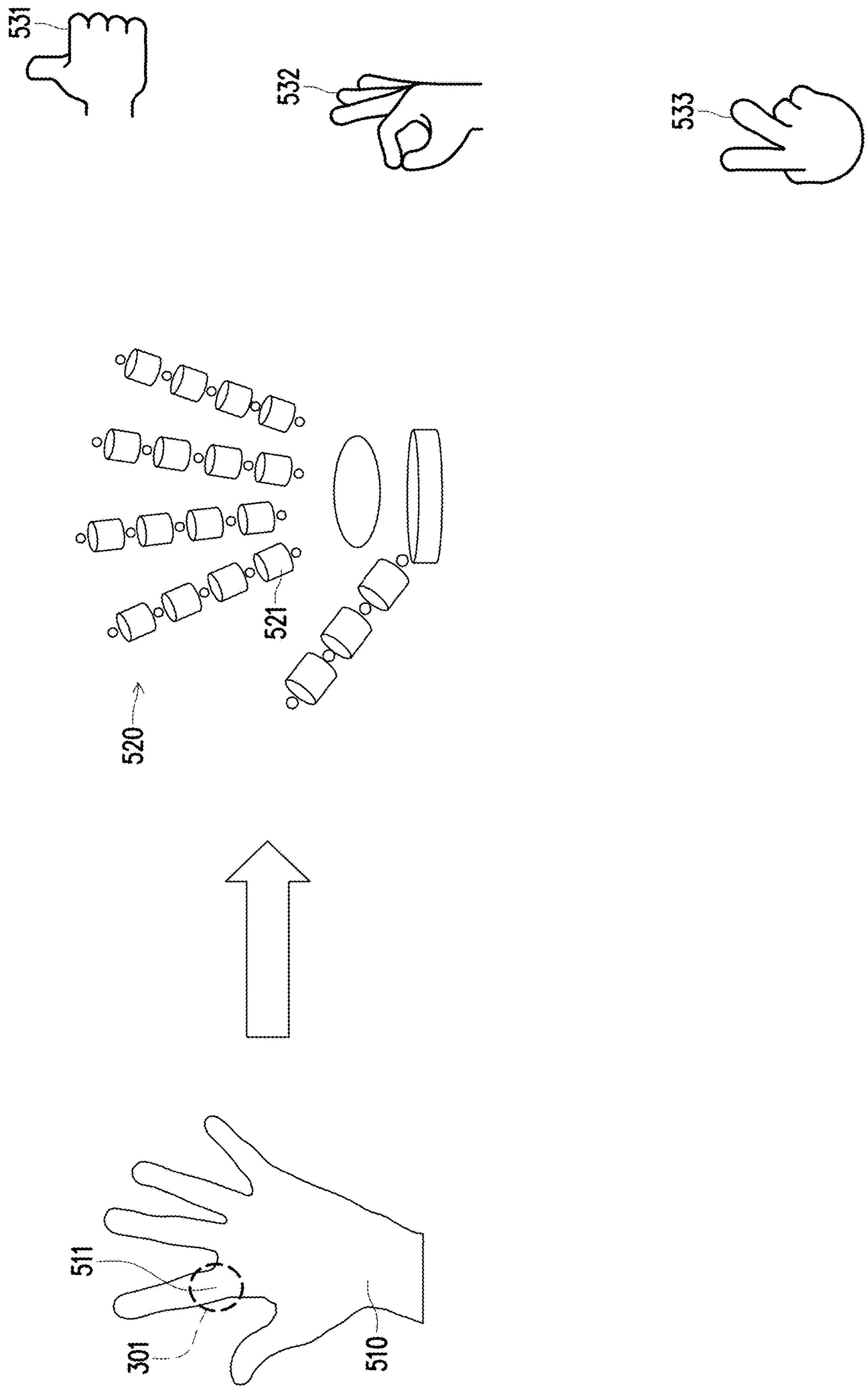
FIG. 6A shows a schematic diagram of determining the reference direction according to the second embodiment of the disclosure.

See FIG. 6A, which shows a schematic diagram of determining the reference direction according to the second embodiment of the disclosure.

In the second embodiment where the calibrating device 200 may be the host (e.g., the HMD), the calibrating device 200 may track a hand gesture 520 of a hand 510, wherein the hand 510 has a first joint wearing the input device 301.

In FIG. 6A, it is assumed that the user wears an input device 301 (e.g., a smart ring) on the first joint 511 of the hand 599 and uses the input device 301 to interact with the virtual world (e.g., the VR world) of the reality service provided by the host (e.g., the calibrating device 200).

In the embodiment, the hand gesture 520 of the hand 599 may be characterized by the corresponding skeleton map, but the disclosure is not limited thereto.

In one embodiment, the calibrating device 200 may determine whether the hand gesture 520 has performed a target gesture. If yes, the calibrating device 200 may obtain a joint pose 521 of the first joint 511 of the hand 510.

In some embodiments, the target gesture may be determined based on the requirements of the designer, such as one of the predetermined gestures 531-533, but the disclosure is not limited thereto.

For better understanding, the predetermined gesture 532 (e.g., an OK gesture) would be used as an example of the target gesture, but the disclosure is not limited thereto.

In this case, when the calibrating device 200 determines that the hand gesture 520 indicates that the hand 510 has performed the predetermined gesture 532, the calibrating device 200 may obtain the joint pose 521 of the first joint 511 based on the tracked hand gesture 520.

Figure 6B:
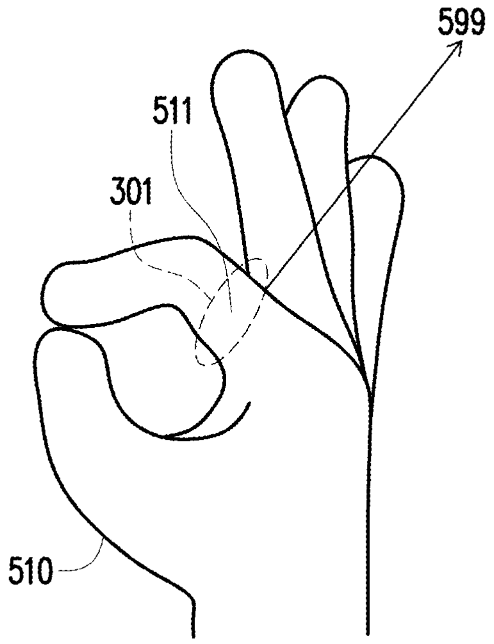
FIG. 6B shows a schematic diagram of deriving the reference direction according to FIG. 6A.

See FIG. 6B, which shows a schematic diagram of deriving the reference direction according to FIG. 6A.

In FIG. 6B, since the hand 510 has performed the predetermined gesture 532, the calibrating device 200 may obtain the joint pose 521 of the first joint 511 and derive the reference direction 599 based on the joint pose 521 of the first joint 511. In the embodiment, the reference direction 599 and the joint pose 521 of the first joint 511 may have a predetermined relative pose therebetween.

In the scenario of FIG. 6B, the predetermined relative pose between the reference direction 599 and the joint pose 521 of the first joint 511 may be characterized by the fixed angle (e.g., a 90-degree angle) between the reference direction 599 and the joint pose 521 of the first joint 511. In this case, once the joint pose 521 of the first joint 511 has been obtained, the calibrating device 200 may determine the reference direction 599 via rotating the orientation of the joint pose 521 of the first joint 511 by the fixed angle (e.g., 90 degrees), but the disclosure is not limited thereto.

In this case, the reference direction 599 may be regarded as the reference direction $V_{ref}$ considered in step S310, but the disclosure is not limited thereto.

In the embodiments where other predetermined gestures are used as the target gesture, the predetermined relative pose between the reference direction 599 and the joint pose 521 of the first joint 511 may be adapted accordingly, but the disclosure is not limited thereto.

In step S320, the processor 204 obtains a current motion data of the input device 301 corresponding to the first virtual object 302 from the motion detection circuit of the input device 301.

In the embodiment, the current motion data may be the current reading of the motion detection circuit. In the embodiment where the motion detection circuit of the input device 301 is the IMU, the current motion data may be the current IMU reading provided by the IMU of the input device 301, which may be represented by a quaternion form of $(Q_w, Q_x, Q_y, Q_z)$, but the disclosure is not limited thereto.

In step S330, the processor 204 obtains a predetermined heading of the motion detection circuit of the input device 301.

In one embodiment, the predetermined heading of the motion detection circuit may also be understood as the initial heading of the motion detection circuit, which may be characterized by:

$$V_{init} = \begin{bmatrix} V_{init}(x) \\ V_{init}(y) \\ V_{init}(z) \end{bmatrix}.$$

In one embodiment, the predetermined heading of the motion detection circuit may be, for example, (0, 0, 1), but the disclosure is not limited thereto.

In step S340, the processor 204 determining a current pose of the first virtual object 302 with respect to the input device 301 based on the predetermined heading (e.g., $V_{init}$) of the motion detection circuit and the current motion data of the input device 301.

In one embodiment, the processor 204 may derive a transforming matrix based on the current motion data of the input device 301.

In one embodiment, the transforming matrix may be characterized by:

$$Q=\begin{bmatrix} 1-Q_yQ_y-Q_zQ_z & Q_xQ_y-Q_zQ_w & Q_xQ_z+Q_yQ_w \\ Q_xQ_y+Q_zQ_w & 1-Q_xQ_x-Q_zQ_z & Q_yQ_z-Q_xQ_w \\ Q_xQ_z-Q_yQ_w & Q_yQ_z+Q_xQ_w & 1-Q_xQ_x-Q_yQ_y \end{bmatrix},$$

but the disclosure is not limited thereto.

Afterwards, the processor 204 may transform the predetermined heading of the motion detection circuit into the current pose of the first virtual object 302 with respect to the input device 301 by using the transforming matrix (e.g., Q).

In one embodiment, the current pose of the first virtual object 302 with respect to the input device 301 may be characterized by:

$$V_{imu}=QV_{init}=\begin{bmatrix} 1-QyQy-QzQz & QxQy-QzQw & QxQz+QyQw \\ QxQy+QzQw & 1-QxQx-QzQz & QyQz-QxQw \\ QxQz-QyQw & QyQz+QxQw & 1-QxQx-QyQy \end{bmatrix}\begin{bmatrix} V_{init}(x) \\ V_{init}(y) \\ V_{init}(z) \end{bmatrix},$$

but the disclosure is not limited thereto.

In step S350, the processor 204 determines a calibrating factor based on the reference direction and the current pose of the first virtual object 302.

In one embodiment, the processor 204 may determine a first angle based on an inner product result of the reference direction $V_{ref}$ and the current pose of the first virtual object 302.

For example, the first angle may be characterized by $\theta=\cos^{-1}(V_{ref}\cdot V_{imu})$, but the disclosure is not limited thereto.

In addition, the processor 204 may determine a normal direction based on an outer product result of the reference direction $V_{ref}$ and the current pose of the first virtual object 302.

For example, the normal direction may be characterized by $n=(n_x, n_y, n_z)=V_{ref}\otimes V_{imu}$, but the disclosure is not limited thereto.

Next, the processor 204 may determine the calibrating factor based on the inner product result and the outer product result.

In one embodiment, the calibrating factor may be characterized by $Q_{fix}=(\cos(\theta/2), n_x \sin\theta/2, n_y \sin\theta/2, n_z \sin\theta/2)$, but the disclosure is not limited thereto.

In step S360, the processor 204 calibrates the object pose of the first virtual object 302 based on the calibrating factor $Q_{fix}$.

In one embodiment, the processor 204 may calibrate an orientation of the first virtual object 204 by the calibrating factor $Q_{fix}$.

In the first embodiment where the calibrating device 200 is the input device 301 (e.g., the calibrating device 200 and the input device 301 are the same device), the calibrating device 200 may provide the reference direction $V_{ref}$ and the calibrated object pose of the first virtual object 302 to the host (e.g., the HMD).

In this case, the host may accordingly display the first virtual object 302 with the calibrated object pose and display the indicator 303 of the first virtual object 302 that indicates the reference direction $V_{ref}$.

Figure 7A:
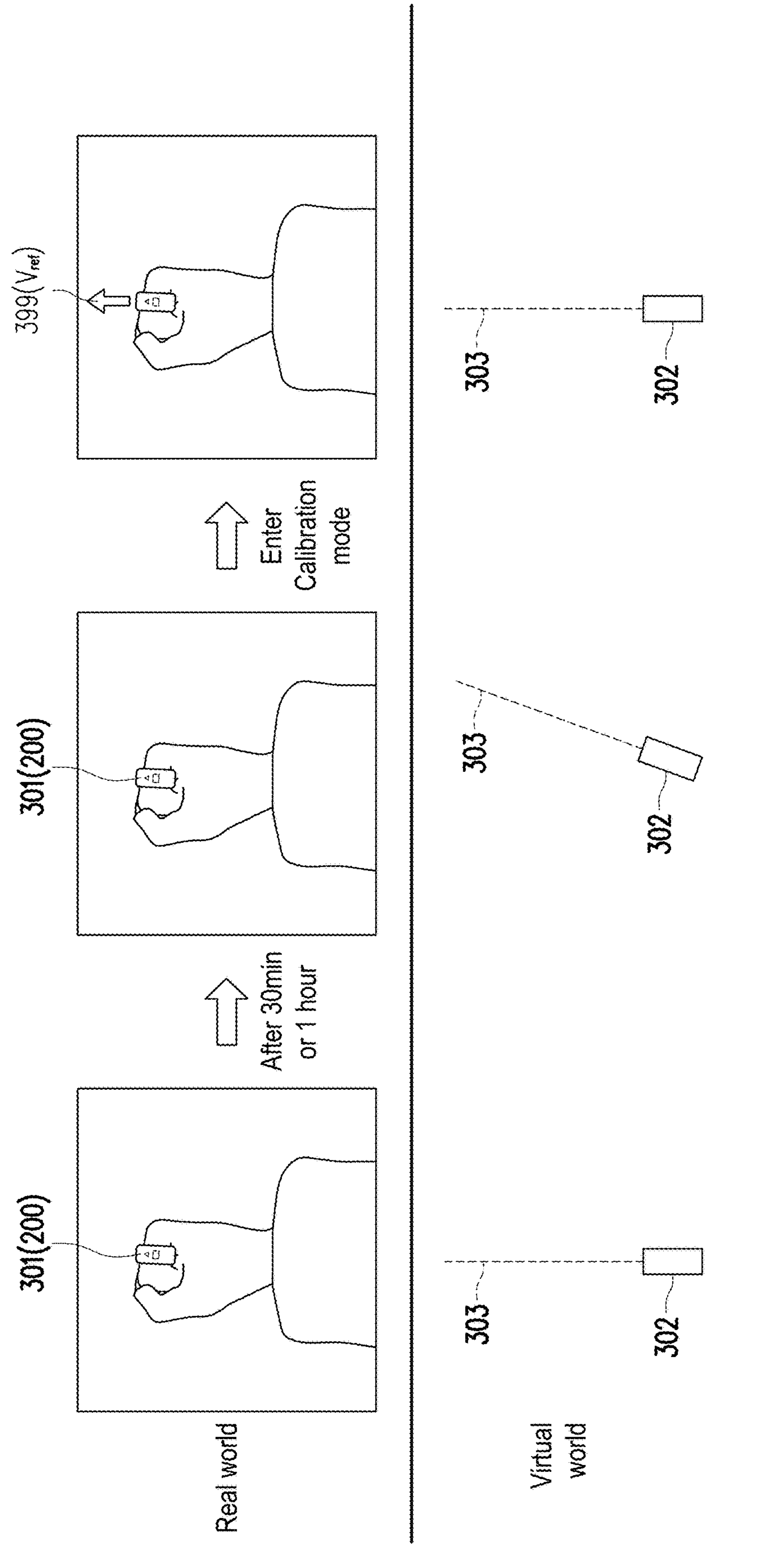
FIG. 7A and FIG. 7B respectively shows a schematic diagram of displaying the calibrated first virtual object and the associated indicator according to FIG. 4A and FIG. 5.
Figure 7B:
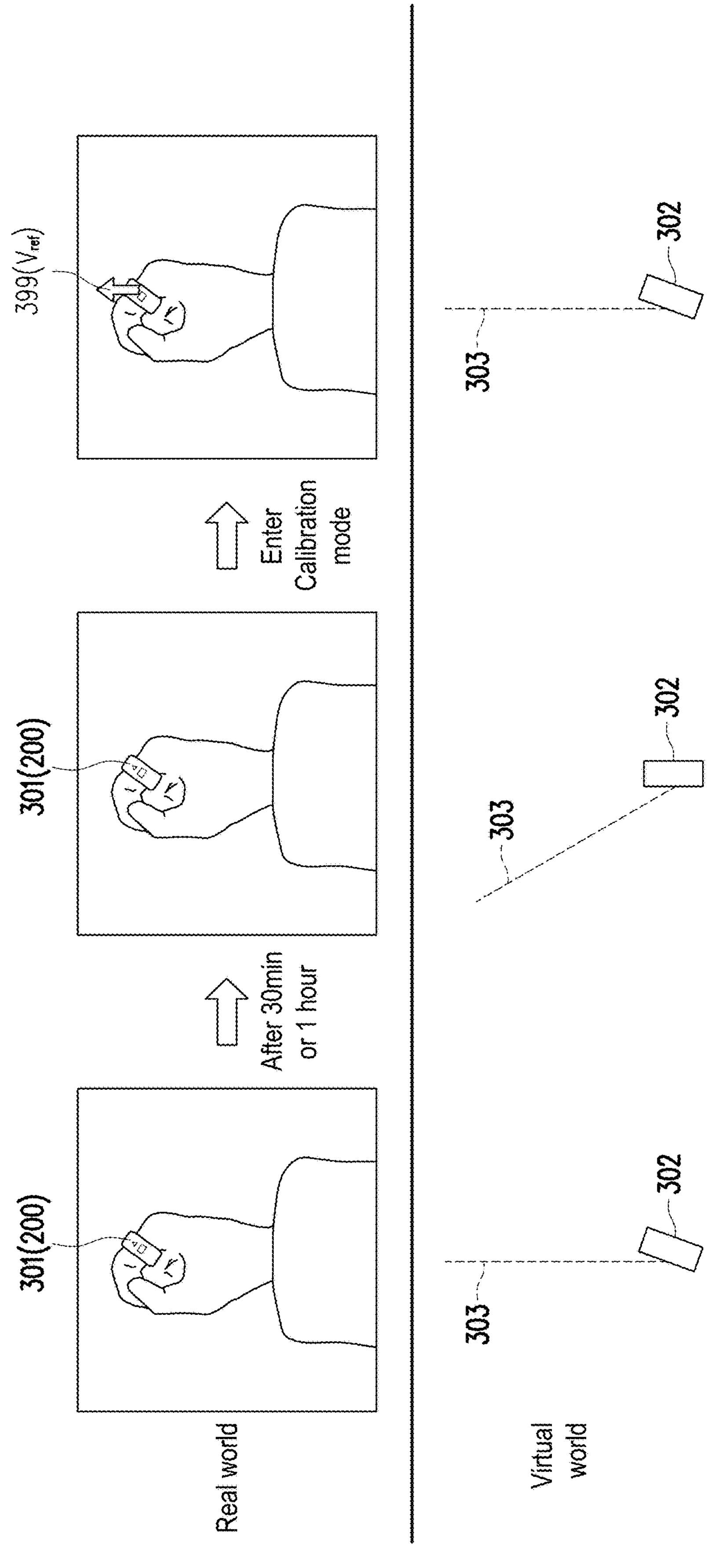

See FIG. 7A and FIG. 7B, wherein FIG. 7A and FIG. 7B respectively shows a schematic diagram of displaying the calibrated first virtual object and the associated indicator according to FIG. 4A and FIG. 5.

In FIG. 7A and FIG. 7B, it can be seen that the first virtual object 302 with the calibrated object pose has been accurately reflect the motion of the input device 301, and the indicator 303 indicates the reference direction $V_{ref}$, which corresponds to the sliding direction 399 in the real world.

In the second embodiment where the calibrating device 200 is the host connected with the input device 301, the calibrating device 200 may display the first virtual object 302 with the calibrated object pose and display the indicator 303 of the first virtual object 302 that indicates the reference direction $V_{ref}$. The associated results may be referred to FIG. 7A and FIG. 7B, which would not be repeated herein.

Figure 8A:
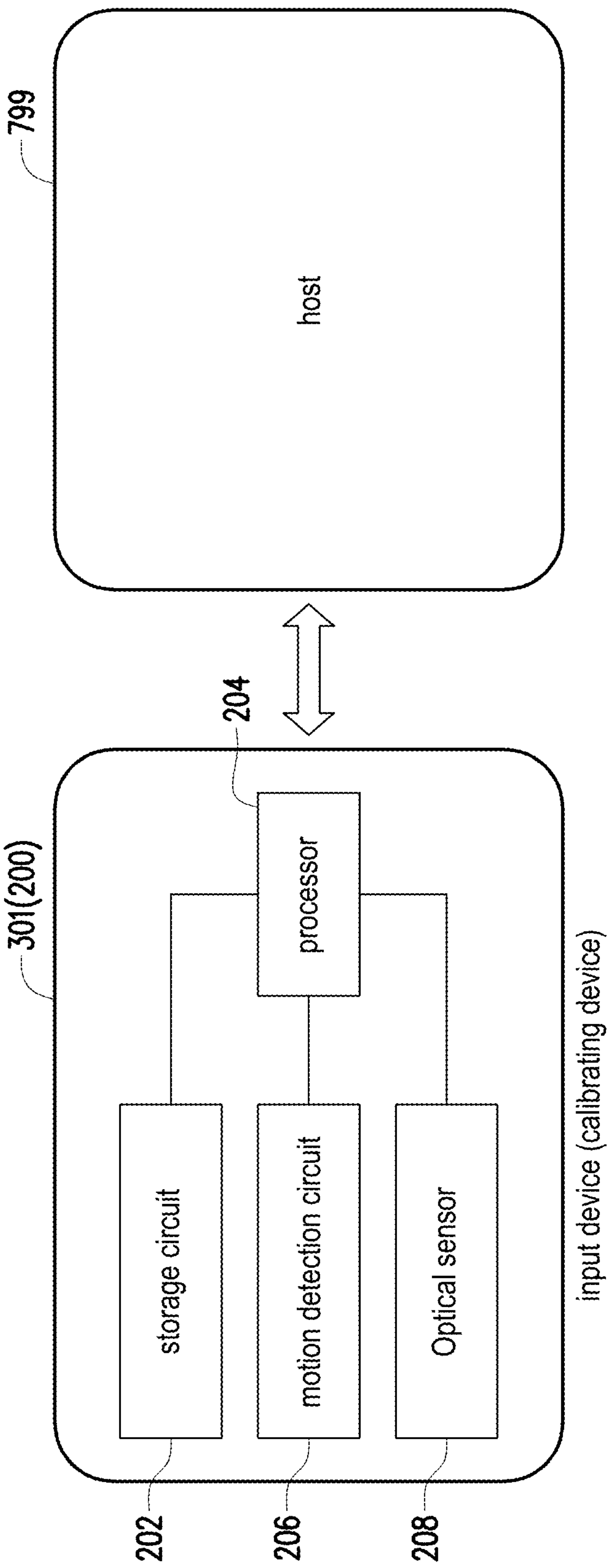
FIG. 8A shows a systematic diagram of the input device and the host according to the first embodiment of the disclosure.

See FIG. 8A, which shows a systematic diagram of the input device and the host according to the first embodiment of the disclosure.

In the first embodiment where the calibrating device 200 is the input device 301, the calibrating device 200 may further include the motion detection circuit 206 and the optical sensor 208 coupled to the processor 204, and how the calibrating device 200 implements the proposed method of the disclosure may be referred to the above descriptions, which would not be repeated herein.

Figure 8B:
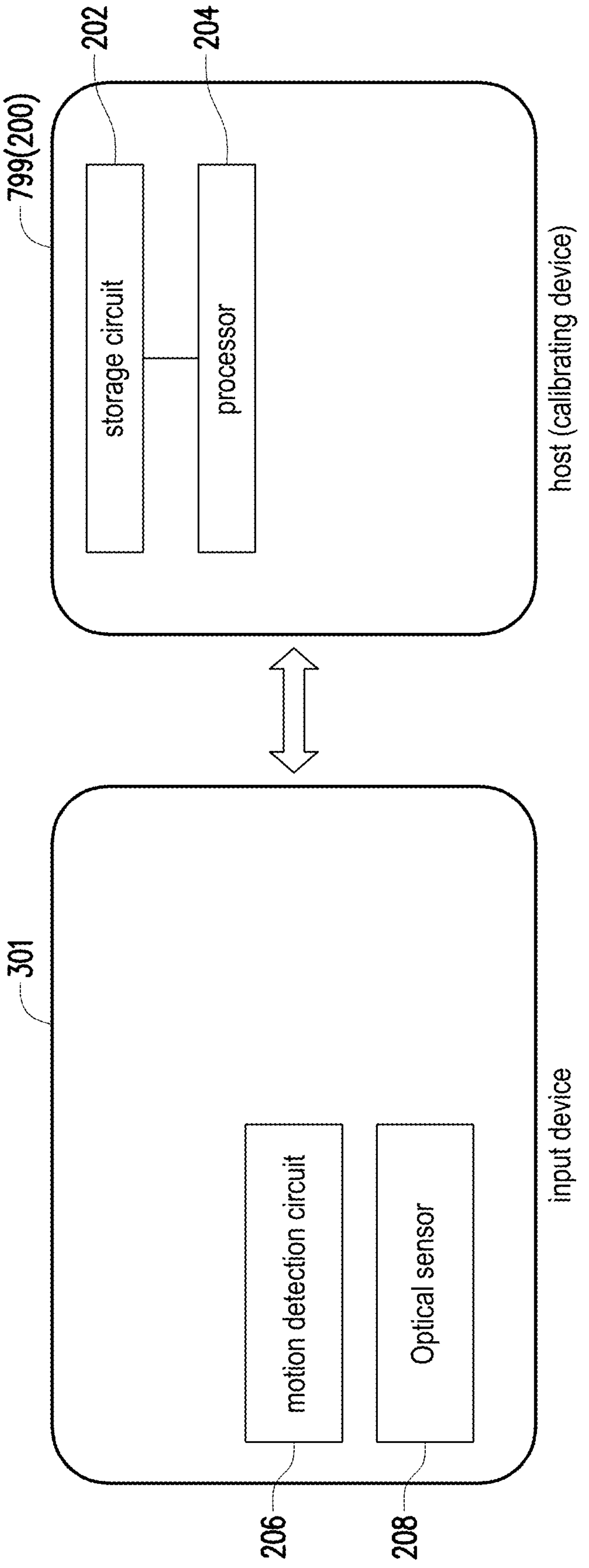
FIG. 8B shows a systematic diagram of the input device and the host according to the second embodiment of the disclosure.

See FIG. 8B, which shows a systematic diagram of the input device and the host according to the second embodiment of the disclosure.

In the second embodiment where the calibrating device 200 is the host 799 connected with the input device 301, the calibrating device 200 may implement the proposed method of the disclosure based on the information provided by the motion detection circuit 206 and the optical sensor 208 in the input device 301, and how the calibrating device 200 implements the proposed method may be referred to the above descriptions, which would not be repeated herein.

In summary, the embodiments of the disclosure provide a solution to re-align the object pose of the virtual object in the virtual world with the input device in the real world based on the inputted direction of the user. Accordingly, the user experience would not be affected by the virtual model and/or ray drifted away from the input device in the real world.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for calibrating a virtual object, applied to a calibrating device, comprising:

determining, by the calibrating device, a reference direction associated with a first virtual object in a virtual world;

obtaining, by the calibrating device, a current motion data of an input device corresponding to the first virtual object from a motion detection circuit of the input device;

obtaining, by the calibrating device, a predetermined heading of the motion detection circuit of the input device;

determining, by the calibrating device, a current pose of the first virtual object with respect to the input device based on the predetermined heading of the motion detection circuit and the current motion data of the input device;

determining, by the calibrating device, a calibrating factor based on the reference direction and the current pose of the first virtual object; and calibrating, by the calibrating device, an object pose of the first virtual object based on the calibrating factor.

2. The method according to claim 1, wherein the first virtual object has an indicator in the virtual world, and the reference direction corresponds to a designated direction of the indicator.

3. The method according to claim 1, wherein determining, by the calibrating device, the reference direction associated with the first virtual object in the virtual world comprises:

detecting a sliding direction by using an optical sensor of the calibrating device;

converting the sliding direction into a designated direction based on a relative position between a first coordinate system of the optical sensor and a second coordinate system of the motion detection circuit; and determining the designated direction as the reference direction.

4. The method according to claim 1, wherein determining, by the calibrating device, the reference direction associated with the first virtual object in the virtual world comprises:

tracking a hand gesture of a hand, wherein the hand has a first joint wearing the input device;

in response to determining that the hand gesture has performed a target gesture, obtaining a joint pose of the first joint of the hand; and deriving the reference direction based on the joint pose of the first joint, wherein the reference direction and the joint pose of the first joint has a predetermined relative pose therebetween.

5. The method according to claim 1, wherein determining, by the calibrating device, the current pose of the first virtual object with respect to the input device based on the predetermined heading of the motion detection circuit and the current motion data of the input device comprises:

deriving a transforming matrix based on the current motion data of the input device;

transforming the predetermined heading of the motion detection circuit into the current pose of the first virtual object with respect to the input device by using the transforming matrix.

6. The method according to claim 5, wherein the current pose of the first virtual object with respect to the input device is characterized by:

$$V_{imu}=QV_{init}$$

wherein Q is the transforming matrix and $V_{init}$ is the predetermined heading of the motion detection circuit.

7. The method according to claim 6, wherein the transforming matrix is characterized by:

$$Q=\begin{bmatrix} 1-Q_yQ_y-Q_zQ_z & Q_xQ_y-Q_zQ_w & Q_xQ_z+Q_yQ_w \\ Q_xQ_y+Q_zQ_w & 1-Q_xQ_x-Q_zQ_z & Q_yQ_z-Q_xQ_w \\ Q_xQ_z-Q_yQ_w & Q_yQ_z+Q_xQ_w & 1-Q_xQ_x-Q_yQ_y \end{bmatrix}$$

wherein $(Q_w, Q_x, Q_y, Q_z)$ is the current motion data of the input device.

8. The method according to claim 1, wherein determining, by the calibrating device, the calibrating factor based on the reference direction and the current pose of the first virtual object comprises:

determining a first angle based on an inner product result of the reference direction and the current pose of the first virtual object;

determining a normal direction based on an outer product result of the reference direction and the current pose of the first virtual object; and determining the calibrating factor based on the inner product result and the outer product result.

9. The method according to claim 8, wherein the first angle is characterized by:

$$\theta=\cos^{-1}(V_{ref}\cdot V_{imu}),$$

wherein $V_{ref}$ is the reference direction and $V_{imu}$ is the current pose of the first virtual object.

10. The method according to claim 8, wherein the normal direction is characterized by:

$$n=(n_x, n_y, n_z)=V_{ref}\otimes V_{imu},$$

wherein $V_{ref}$ is the reference direction and $V_{imu}$ is the current pose of the first virtual object.

11. The method according to claim 8, wherein the calibrating factor is characterized by:

$$Q_{fix}=(\cos(\theta/2), n_x\sin\theta/2, n_y\sin\theta/2, n_z\sin\theta/2),$$

wherein θ is the first angle.

12. The method according to claim 1, wherein calibrating, by the calibrating device, the object pose of the first virtual object based on the calibrating factor comprises:

calibrating an orientation of the first virtual object by the calibrating factor.

13. The method according to claim 1, further comprising:

providing, by the calibrating device, the reference direction and the calibrated object pose of the first virtual object to a host.

14. The method according to claim 1, further comprising:

displaying, by the calibrating device, the first virtual object with the calibrated object pose;

displaying, by the calibrating device, an indicator of the first virtual object that indicates the reference direction.

15. A calibrating device, comprising:

a non-transitory storage circuit, storing a program code; and a processor, coupled to the non-transitory storage circuit and accessing the program code to perform:

determining a reference direction associated with a first virtual object in a virtual world;

obtaining a current motion data of an input device corresponding to the first virtual object from a motion detection circuit of the input device;

obtaining a predetermined heading of the motion detection circuit of the input device;

determining a current pose of the first virtual object with respect to the input device based on the predetermined heading of the motion detection circuit and the current motion data of the input device;

determining a calibrating factor based on the reference direction and the current pose of the first virtual object; and calibrating an object pose of the first virtual object based on the calibrating factor.

16. The calibrating device according to claim 15, wherein the first virtual object has an indicator in the virtual world, and the reference direction corresponds to a designated direction of the indicator.

17. The calibrating device according to claim 15, wherein the processor is configured to perform:

detecting a sliding direction by using an optical sensor of the calibrating device;

converting the sliding direction into a designated direction based on a relative position between a first coordinate system of the optical sensor and a second coordinate system of the motion detection circuit; and determining the designated direction as the reference direction.

18. The calibrating device according to claim 15, wherein the processor is configured to perform:

tracking a hand gesture of a hand, wherein the hand has a first joint wearing the input device;

in response to determining that the hand gesture has performed a target gesture, obtaining a joint pose of the first joint of the hand; and deriving the reference direction based on the joint pose of the first joint, wherein the reference direction and the joint pose of the first joint has a predetermined relative pose therebetween.

19. The calibrating device according to claim 15, wherein the processor is configured to perform:

deriving a transforming matrix based on the current motion data of the input device;

transforming the predetermined heading of the motion detection circuit into the current pose of the first virtual object with respect to the input device by using the transforming matrix.

20. The calibrating device according to claim 15, wherein the processor is configured to perform:

determining a first angle based on an inner product result of the reference direction and the current pose of the first virtual object;

determining a normal direction based on an outer product result of the reference direction and the current pose of the first virtual object; and determining the calibrating factor based on the inner product result and the outer product result.

* * * * *